US008762415B2

(12) United States Patent
Catahan, Jr. et al.

(10) Patent No.: US 8,762,415 B2
(45) Date of Patent: Jun. 24, 2014

(54) MODELING OF ORDER DATA

(75) Inventors: Nardo B. Catahan, Jr., South San Francisco, CA (US); Shekhar P. Kale, Foster City, CA (US); Shailendra Garg, Sunnyvale, CA (US); Maria Theresa Barnes Leon, Fremont, CA (US); Ramaswamy Sundararajan, Cupertino, CA (US)

(73) Assignee: Siebel Systems, Inc., San Mateo, CA (US)

( * ) Notice: Subject to any disclaimer, the term of this patent is extended or adjusted under 35 U.S.C. 154(b) by 1398 days.

(21) Appl. No.: 10/703,053

(22) Filed: Nov. 5, 2003

(65) Prior Publication Data

US 2004/0193510 A1  Sep. 30, 2004

Related U.S. Application Data

(60) Provisional application No. 60/457,864, filed on Mar. 25, 2003.

(51) Int. Cl.
*G06F 7/00* (2006.01)
*G06F 17/30* (2006.01)
(52) U.S. Cl.
USPC .............................. 707/793; 707/804; 705/20
(58) Field of Classification Search
USPC ........... 707/10, 1, 104.1, 793; 705/39, 40, 14; 717/108; 209/328
See application file for complete search history.

(56) References Cited

U.S. PATENT DOCUMENTS

| 4,953,080 | A | | 8/1990 | Dysart et al. ............... 707/103 R |
|---|---|---|---|---|
| 5,361,350 | A | | 11/1994 | Conner et al. ............ 707/103 R |
| 5,819,270 | A | | 10/1998 | Malone et al. ..................... 707/7 |
| 5,963,924 | A | | 10/1999 | Williams et al. |
| 6,016,484 | A | | 1/2000 | Williams et al. |
| 6,088,717 | A | | 7/2000 | Reed et al. ..................... 709/201 |
| 6,125,391 | A | * | 9/2000 | Meltzer et al. ................ 709/223 |
| 6,154,738 | A | * | 11/2000 | Call ................................. 705/20 |
| 6,225,546 | B1 | * | 5/2001 | Kraft et al. ...................... 84/609 |
| 6,601,075 | B1 | * | 7/2003 | Huang et al. ................... 707/748 |
| 6,681,223 | B1 | * | 1/2004 | Sundaresan .......................... 1/1 |
| 6,728,948 | B1 | * | 4/2004 | Baxter et al. ................... 717/108 |
| 6,766,361 | B1 | * | 7/2004 | Venigalla ...................... 709/217 |
| 6,768,994 | B1 | * | 7/2004 | Howard et al. ........................ 1/1 |
| 6,873,991 | B2 | * | 3/2005 | Carroll et al. ........................ 1/1 |
| 6,941,298 | B2 | * | 9/2005 | Chow et al. .......................... 1/1 |
| 6,990,656 | B2 | * | 1/2006 | Ersek et al. ................... 717/121 |
| 7,005,970 | B2 | * | 2/2006 | Hodsdon et al. .......... 340/323 R |
| 7,162,540 | B2 | * | 1/2007 | Jasen et al. ..................... 709/242 |
| 2001/0042023 | A1 | * | 11/2001 | Anderson et al. ............... 705/26 |

(Continued)

FOREIGN PATENT DOCUMENTS

WO  WO 02/065360  8/2002 ............. G06F 17/60

OTHER PUBLICATIONS

Dr. Jeff Sutherland, The Object Technology Architecture: Business Objects for Corporate Information Systems, 1997, pp. 1-9.*

(Continued)

*Primary Examiner* — Binh V Ho
(74) *Attorney, Agent, or Firm* — Campbell Stephenson LLP

(57) ABSTRACT

An order class is defined which includes multiple data elements that are common to various order types. The order class identifies relationships of an order with various entities related to the order.

10 Claims, 18 Drawing Sheets

(56) References Cited

U.S. PATENT DOCUMENTS

| | | | | |
|---|---|---|---|---|
| 2002/0055870 | A1 | 5/2002 | Thomas | 705/10 |
| 2002/0055878 | A1* | 5/2002 | Burton et al. | 705/26 |
| 2002/0059425 | A1 | 5/2002 | Belfiore et al. | 709/226 |
| 2002/0069081 | A1 | 6/2002 | Ingram et al. | 705/1 |
| 2002/0099735 | A1* | 7/2002 | Schroeder et al. | 707/513 |
| 2002/0129059 | A1 | 9/2002 | Eck | 707/513 |
| 2002/0143655 | A1* | 10/2002 | Elston et al. | 705/26 |
| 2003/0009437 | A1 | 1/2003 | Seiler et al. | 707/1 |
| 2003/0014617 | A1 | 1/2003 | Tamboli et al. | 713/1 |
| 2003/0018502 | A1* | 1/2003 | Rodriguez | 705/7 |
| 2003/0018832 | A1 | 1/2003 | Amirisetty et al. | 70/328 |
| 2003/0154293 | A1 | 8/2003 | Zmolek | 709/228 |
| 2003/0163603 | A1* | 8/2003 | Fry et al. | 709/328 |
| 2004/0015783 | A1 | 1/2004 | Lennon et al. | 715/523 |
| 2004/0261026 | A1 | 12/2004 | Corson | 715/704 |
| 2005/0144087 | A1 | 6/2005 | Huang et al. | 705/26 |

OTHER PUBLICATIONS

Blaise Doughan, Introduction to TopLink Object-XML Mapping, pp. 1-4.*

Damian Conway, The Booch Notation, Jul. 1999, pp. 1-19.*

PCT Search Report, PCT/US04/04385, mailed Oct. 19, 2005, (7 pgs.).

Pascal Laik et al., "Modeling of Activity Data," U.S. Appl. No. 10/851,312, filed May 21, 2004.

PCT Search Report, PCT/U04/04385, date of mailing Oct. 19, 2005, 7 pages.

Gauthier, Pierre, Editor; "OSS Through Java—OSS through Java™ J2EE Design Guidelines," Internet Citation [Online], Oct. 31, 2001, Retrieved from the Internet: URL:http://www.ossj.org/downloads/Design_guidelines.shtml, [retrieved Apr. 20, 2005]; pp. 1-115.; Ref. No. XP-002325475.

Hohpe, Gregor et al., "Thought-Works, The Art of Heavy Lifting; Test-Driven Development in Enterprise Integration Projects," Nov. 2002, Retrieved from the Internet: URL: http://enterpriseintegrationpatterns._com_/docs/TestDriveEAI.pdf, [retrieved on Jan. 13, 2007]; pp. 1-15; Ref. No. XP-007901994.

OSS Through Java TM Initiative—Service Activation API,"Version 1.0, Mar. 7, 2002 Final," Internet Citation, [Online], Jul. 3, 2002, Retrieved from the Internet: URL:http://java.sun.com/products/oss/downloads/jsr89_downloads.html, [retrieved on Apr. 23, 2007]; pp. 1-80.

* cited by examiner

MODELING OF ORDER DATA

RELATED APPLICATIONS

This application claims the benefit of U.S. Provisional Patent application Ser. No. 60/457,864 filed Mar. 25, 2003, which is hereby incorporated by reference.

FIELD OF THE INVENTION

This invention relates generally to data modeling, and more particularly to modeling of order data.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

Various business entities, such as companies, store information electronically in furtherance of their business needs. These companies may have extensive databases of information that include order tables, customer tables, supplier tables, employee tables, and so on. The schemas and data models associated with these databases may be customized to help meet the business needs of the company. For example, an automotive manufacturer may organize information about its orders in a way that is very different from the way that an online bookstore may organize information about its orders. Even within a single company, that company may use many different application programs that employ very different schemas and data models. For example, a sales application program may use a data model that is very different from the data model used by an accounting program. The use of customized data models by a company and by applications within the company has the advantage that it allows information to be modeled in a way that is appropriate for business needs of the company. Unfortunately, because of this diversity in the data models, it is not easy for the company to share its information with other companies or for applications to share their information.

Various attempts have been made to define standard data models so that information can be more easily shared between companies and applications. However, these data models have not been able to achieve sufficient data integration and simplicity. As a result, companies have to maintain, support and upgrade multiple different data structures and maps for their products.

SUMMARY OF THE INVENTION

The present invention relates to various aspects for modeling order data.

According to one aspect of the present invention, an order class is defined which includes multiple data elements that are common to various order types. The order class identifies relationships of an order with various entities related to the order.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

Figure 1:
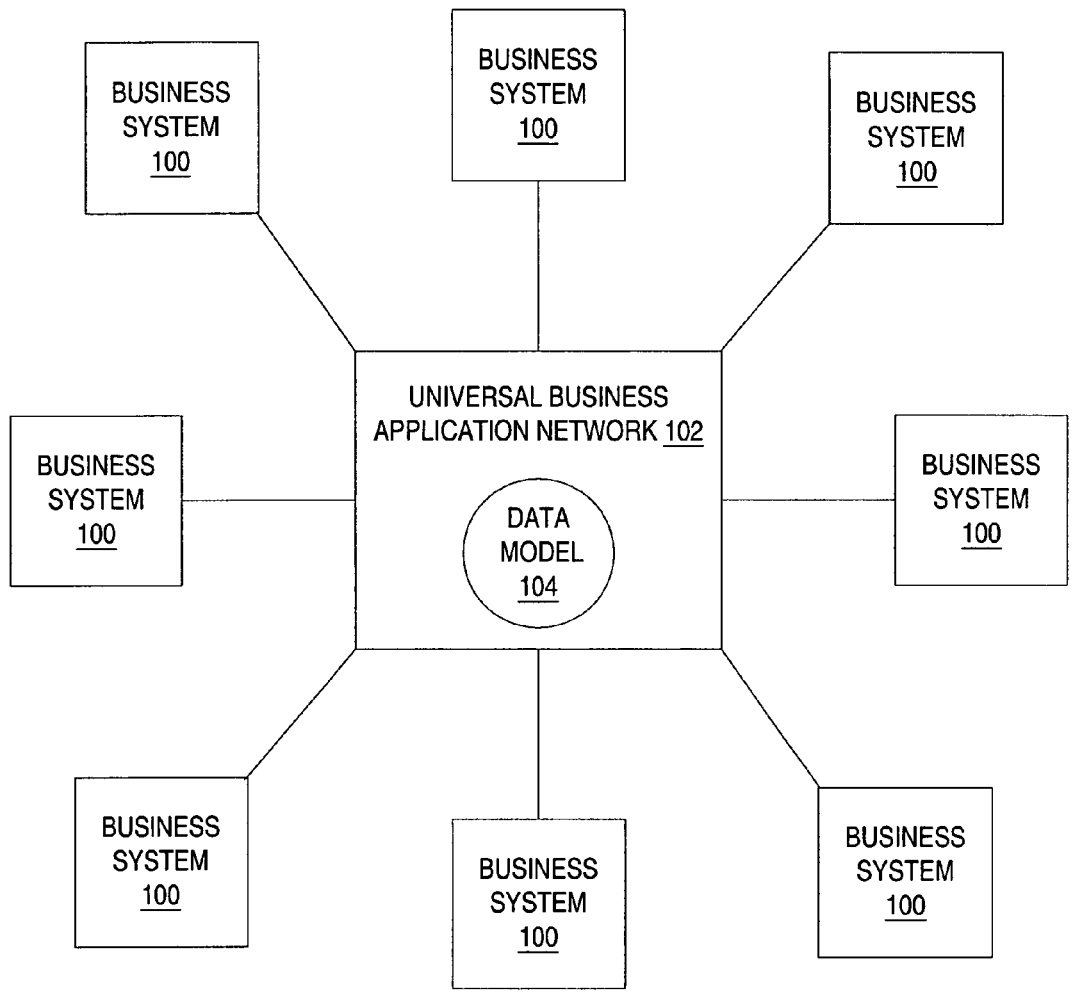
FIG. 1 is a block diagram illustrating the interconnection between various business systems and a universal business application network, according to one embodiment of the present invention.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

A data model that provides a common data structure to represent an order and allows for customization of the data model in a manner that facilitates upgrading of the data model is described. In one embodiment, the data model defines an order class that includes a set of data elements that are common to various order types. The various order types may include, for example, a sales order (an order to purchase a product), an order return (a return of a previously ordered product), an order credit memo (a document for crediting an amount previously overcharged for an order), an order debit memo (a document for debiting an amount previously undercharged for an order), an order cancellation (a cancellation of an order), a quote order (a quote for an order), an order contract (a contract associated with an order), etc.

In one embodiment, the order class defines various relationships of an order. These relationships may include relationships with billing terms (terms used to bill for the order), relationships with shipping terms (details about the shipment of the order), relationships with pricing terms (details on pricing the order), relationships with payment terms (details on paying for the order), relationships with parties responsible for the order (e.g. a business unit within a company that is responsible for processing the order), relationships with parties participating in the order (e.g., a supplier, a wholesale dealer, etc.), and relationships with inventory locations (e.g., the location of an ordered product), etc. The data model models the relationships as attributes associated with an order.

In one embodiment, the data model defines an order line sub-class derived from the order class. The order line sub-class includes the data elements from the order class and some additional data elements that provide details about an order line with an order.

In one embodiment, the data model is specified using a schema language such as XML Schema.

In one embodiment, the data model defines a hierarchy of the data elements for describing an order. The data model may define data elements that are complex. A complex data element is a data element that comprises data sub-elements. For example, an address data element may be a complex data element that includes street, city, and state data sub-elements. The data model may specify custom data elements at various places within the hierarchy of data elements. A custom data element is of a custom data element type. The custom data element type initially defines no data elements. The data model can be customized by defining custom data elements that are specific to different applications or systems. Because the custom data elements are defined at various places within the hierarchy, the customizations of the data model can be associated with related data elements within the hierarchy.

Accordingly, a common data model representing various order types allows the companies to maintain, support and upgrade only a single data model and provides for efficient data transformations and mappings. In addition, the existence of custom data elements at various levels of the data model's hierarchy simplifies the customization of the common data model.

FIG. 1 is a block diagram illustrating the interconnection between various business systems 100 (e.g., business systems utilizing order related data) and a universal business application network 102, according to one embodiment of the present invention. The universal business application network 100 serves as an integration hub for the business systems 100. The architecture of the universal business application network 102 allows new applications (e.g., new applications utilizing order data) that access legacy business systems to be developed with minimum customization. The legacy business systems can be provided by a single business organization or by different business organizations. The universal business application network 102 allows the order applications to exchange information using a common order data model 104.

In one embodiment, the common data model 104 defines a hierarchical data structure representing an order. This hierarchical data structure includes data elements that are common to all business systems 100. In addition, the hierarchical data structure includes data custom data elements at various levels of the hierarchy to define data fields that are specific to each business system 100, thus providing for easy customization of the common data model 104.

In one embodiment, the universal business application network 102 uses the XML and Web services standards.

Figure 2:
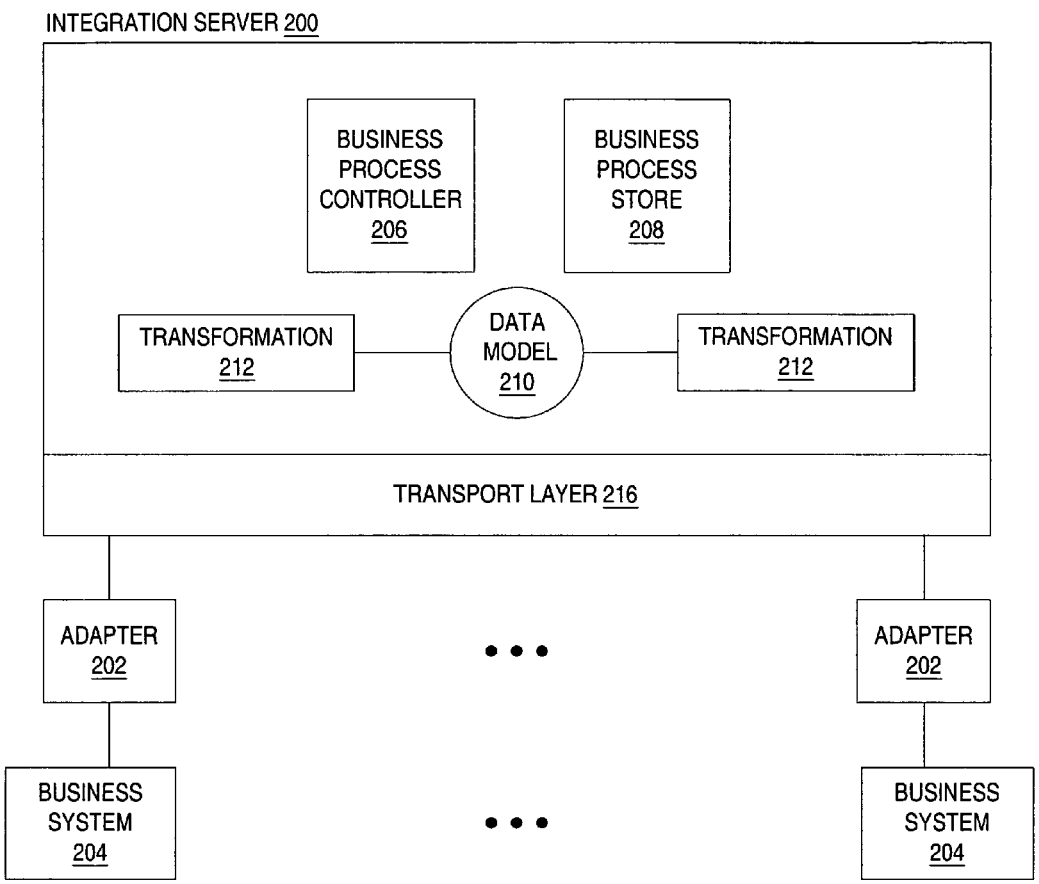
FIG. 2 is a block diagram illustrating the overall architecture of a universal business application network, according to one embodiment of the present invention.

FIG. 2 is a block diagram illustrating the overall architecture of a universal business application network in one embodiment. The hub of the universal business application network is an integration server 200 that connects to the various business systems 204 (e.g., manufacturer systems, supplier systems, wholesaler systems, retailer systems, and other business systems utilizing order related data) via adapters 202. The integration server 200 includes a transport layer 216, a data model 210, a transformation store 214, a business process controller 206, and a business process store 208.

The transport layer 216 is a mechanism through which business information is exchanged between the business systems 204 and the business integration server 200. Each business system 204 may have an adapter 202 that is appropriate to the protocol of the transport layer. For example, the transport mechanism may use communications protocols such as TCP/IP. The transport layer 216 may provide a messaging service for queuing, for guaranteeing delivery of messages, and for handling both synchronous and asynchronous messaging. The adapters 202 relay events from the business systems 204 to the integration server 200 and can import configurations of the business systems 204 into the integration server 200. In addition, the universal business application network may include encryption and authentication mechanisms to ensure the security and integrity of the information. For example, authentication will help ensure that a business process is accessing the intended business system, rather than an impostor business system.

The integration server 200 stores the representation of a data model 210 (e.g., in an XML schema file) that contains the definition of an order class and an order line sub-class derived from the order class.

The transformation store 212 contains a model data definition tool (e.g., an XML schema definition tool) to create a definition of the data model 210 (e.g., in an XML schema file) and to customize the data model 210 when requested by adding custom data fields to the data model 210. The transformation store 212 also contains transformations for transforming information received from the business systems 204 to the format used by the data model 210, and vice versa. For example, an order class may include a globally unique identifier for each order. A transformation for a business system that does not use globally unique identifiers may need to access an identification server to determine the globally unique identifier for each order. The transformations may be specified as a computer program, an XML Stylesheet Language Transform (OXSL TO), etc.

The business process store 208 contains the business processes that have been defined. A business process may be specified as a script, a process flow, an executable program, etc. In one embodiment, the business processes are defined using the Web Services Flow Language (OOWSFL). The business processes orchestrate a sequence of steps across multiple applications provided by the business systems 204 to achieve a business objective.

The business process controller 206 coordinates the execution of the business processes. The business process controller 206 may instantiate a class or a sub-class and invoke functions of the resulting objects in accordance with the various business processes. The business process controller 206 may also initiate the execution of business processes based on predefined conditions and events. For example, the business process controller 206 may launch a certain business process each time an alert is received. Although not shown, the business integration network may provide a standard library of business routines that may be invoked by the business processes. For example, a standard business routine may identify whether two order objects are related via participating parties and create a relationship between the two order objects if they are related. The integration server 200 may also include various tools to facilitate the development of business processes. These tools may aid in the development of transformations, the defining of classes, and the writing of process flows.

Figure 3A:
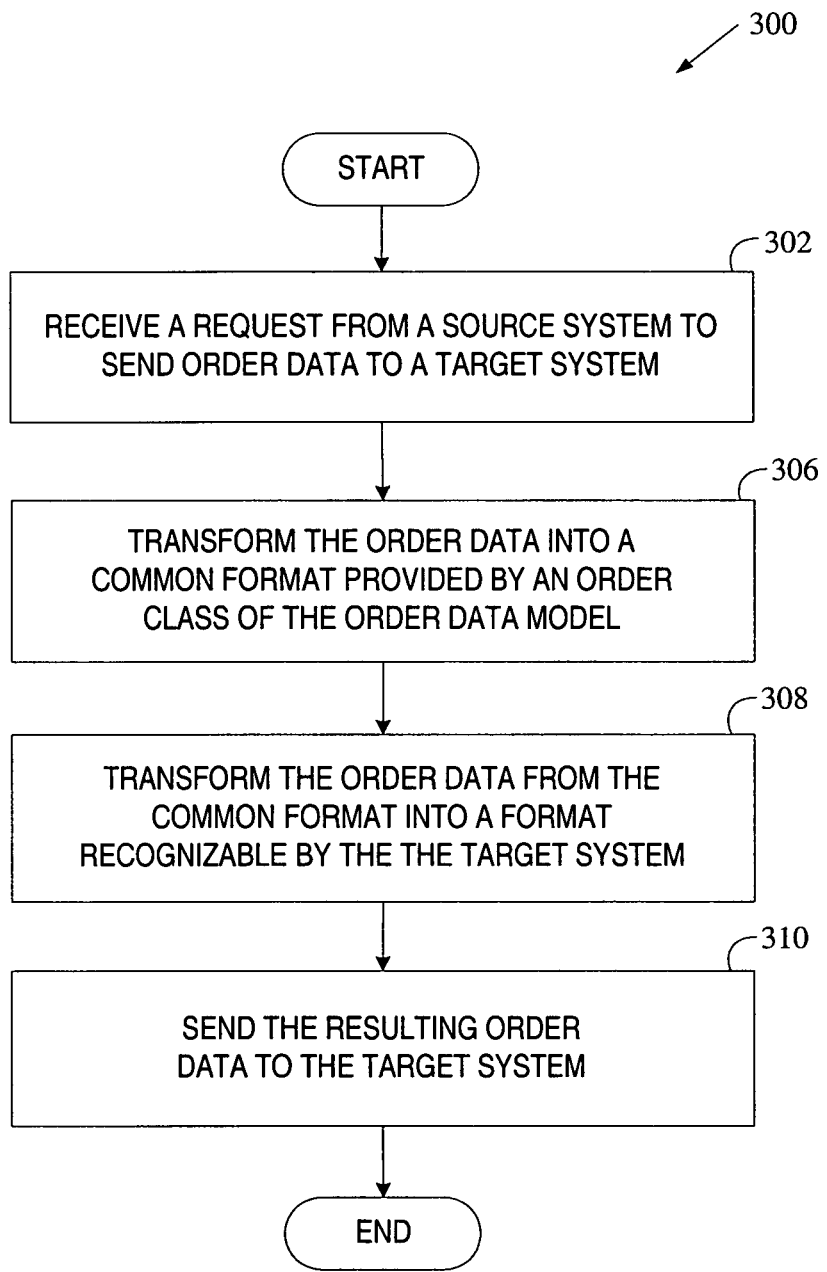
FIG. 3A is a flow diagram of one embodiment of a process for facilitating the sharing of order data between two applications.

FIG. 3A is a flow diagram of one embodiment of a process 300 for facilitating the sharing of order data between two applications utilizing order data. The process may be performed by processing logic that may comprise hardware (e.g., circuitry, dedicated logic, etc.), software (such as run on a general purpose computer system or a dedicated machine), or a combination of both. Processing logic may reside on an integration server such as the integration server 200 of FIG. 2.

Referring to FIG. 3A, process 300 begins with processing logic receiving a request from a source system to send order data to a target system (processing block 302). For example, the order data may be data associated with a new order received by a sales division of a company, a source system may be a front-end application used by the sales division, and a target system may be a back-end application used by a manufacturing division of the company to determine demand for company products. Alternatively, the order data may be data associated with modification of an existing order, data associated with cancellation or return of an existing order, data associated with a credit or debit to be received for an existing order, data associated with a quote for a potential order, data associated with a contract related to an order, etc.

At processing block 306, processing logic transforms the order data into a common format provided by an order class of the order data model. The order class represents orders of different types and defines relationships of an order with various entities related to the order. The various order types may include, for example, a sales order (an order to purchase a product), an order return (a return of a previously ordered product), an order credit memo (a credit for an amount previously overcharged for an order), an order debit memo (a debit for an amount previously undercharged for an order), an order cancellation (a cancellation of an order), a quote order (a quote for a potential order), an order contract (a contract associated with an order), etc. The entities related to the order may include, for example, related billing terms (terms used to bill for the order), related shipping terms (details about the shipment of the order), related pricing terms (details on pricing the order), related payment terms (details on paying for the order), related parties (e.g., a business unit within a company that is responsible for processing the order, parties participating in the order such as a supplier, a manufacturer, a wholesale dealer, etc.), related inventory locations (e.g., the location of an ordered product), etc. In one embodiment, the relationships of the order object are created during the transformation based on information received from the source system. Alternatively, the relationships may be created by designated business processes (e.g., business processes stored in the business process store 208) after the transformation.

In one embodiment, the order class has a child order line sub-class derived from the order class. The order line sub-class represents an order line within the order and defines relationships of an order line with various entities related to the order line. In one embodiment, the order line sub-class inherits some relationships of its parent order class and defines relationships with some additional entities related to the order line. The additional entities related to the order line may include, for example, a related product (a product related to an ordered product), related product attributes (e.g., size, color and other attributes of an ordered product), a related schedule (an order line schedule according to date and quantity), related shipments (list of shipments for the order line), related product information (information about the product sold), etc.

One embodiment of a process for transforming order data into a common format provided by the order class will be discussed in more details below in conjunction with FIG. 3B.

Further, processing logic transforms the order data from the common format into a format recognizable by the target system (processing block 308) and sends the resulting order data to the target system (processing block 310).

Thus, according to the process 300, the sharing of order data between two applications does not require data mapping between the data format of the source application and the data format of the target application. Instead, the mapping is performed between each application and the common data model.

In one embodiment, each class of the order data model can be customized for a specific business system or application.

Figure 3B:
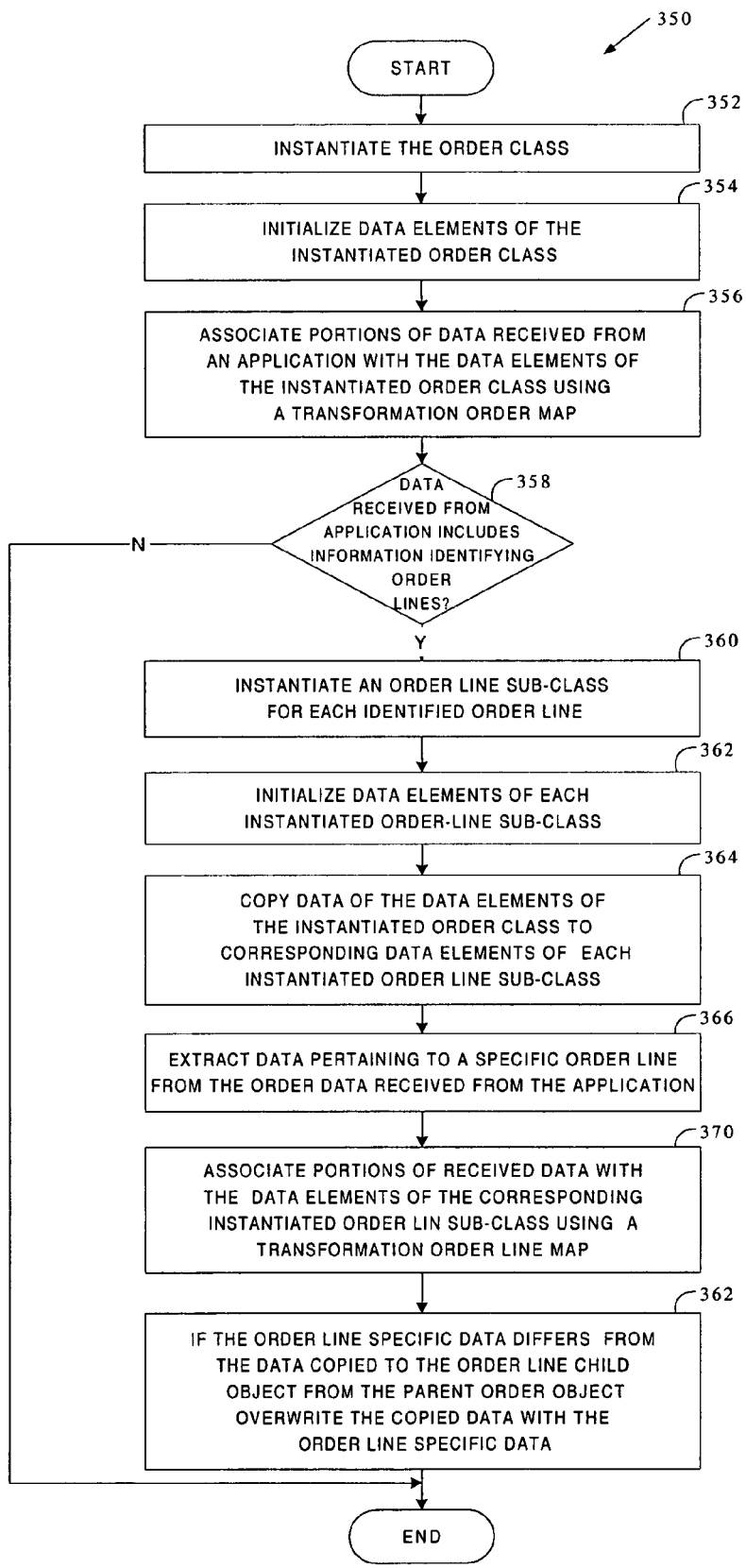
FIG. 3B is a flow diagram of one embodiment of a process for transforming order data into a common format provided by an order class.

FIG. 3B is a flow diagram of one embodiment of a process 350 for transforming order data into a common format provided by an order class. The process may be performed by processing logic that may comprise hardware (e.g., circuitry, dedicated logic, etc.), software (such as run on a general purpose computer system or a dedicated machine), or a combination of both. Processing logic may reside on an integration server such as the integration server 200 of FIG. 2.

Process 350 begins with processing logic creating an order object. In particular, processing logic instantiates the order class (processing block 352), initializes data elements of the instantiated order class (processing block 354), and associates portions of data received from an application with the data elements of the instantiated order class using a transformation order map (processing block 356). The transformation order map defines the data mappings necessary to transform the order data from the format used by the application to the format defined by the order class.

Next, in one embodiment, processing logic defines the relationships of the order object based on the information received from the application. Alternatively, the relationships are created by designated business processes (e.g., business processes stored in the business process store 208) after the transformation.

Further, processing logic determines whether the data received from the application includes information identifying one or more order lines within the order (decision box 358). If not, process 350 ends. If so, processing logic creates an order line child object for each identified order line. In particular, processing logic instantiates an order line sub-class for each identified order line (processing block 360), initializes data elements of each instantiated order line sub-class (processing block 362), and copies data of the data elements of the instantiated order class to corresponding data elements of each instantiated order line sub-class (processing block 364). In one embodiment, each instantiated order sub-class inherits the relationships of the parent order objects.

At processing block 366, processing logic extracts data pertaining to a specific order line from the order data received from the application (processing block 368) and associates portions of the received data with corresponding data elements of the instantiated order line sub-class using a transformation order line map (processing block 370). The transformation order line map defines the data mappings necessary to transform the order line data from the format used by the application to the format defined by the order class. If a portion of the order line specific data differs from the data copied to the order line child object from the parent order object, processing logic overwrites the copied data with the order line specific data (processing block 362).

Figure 4:
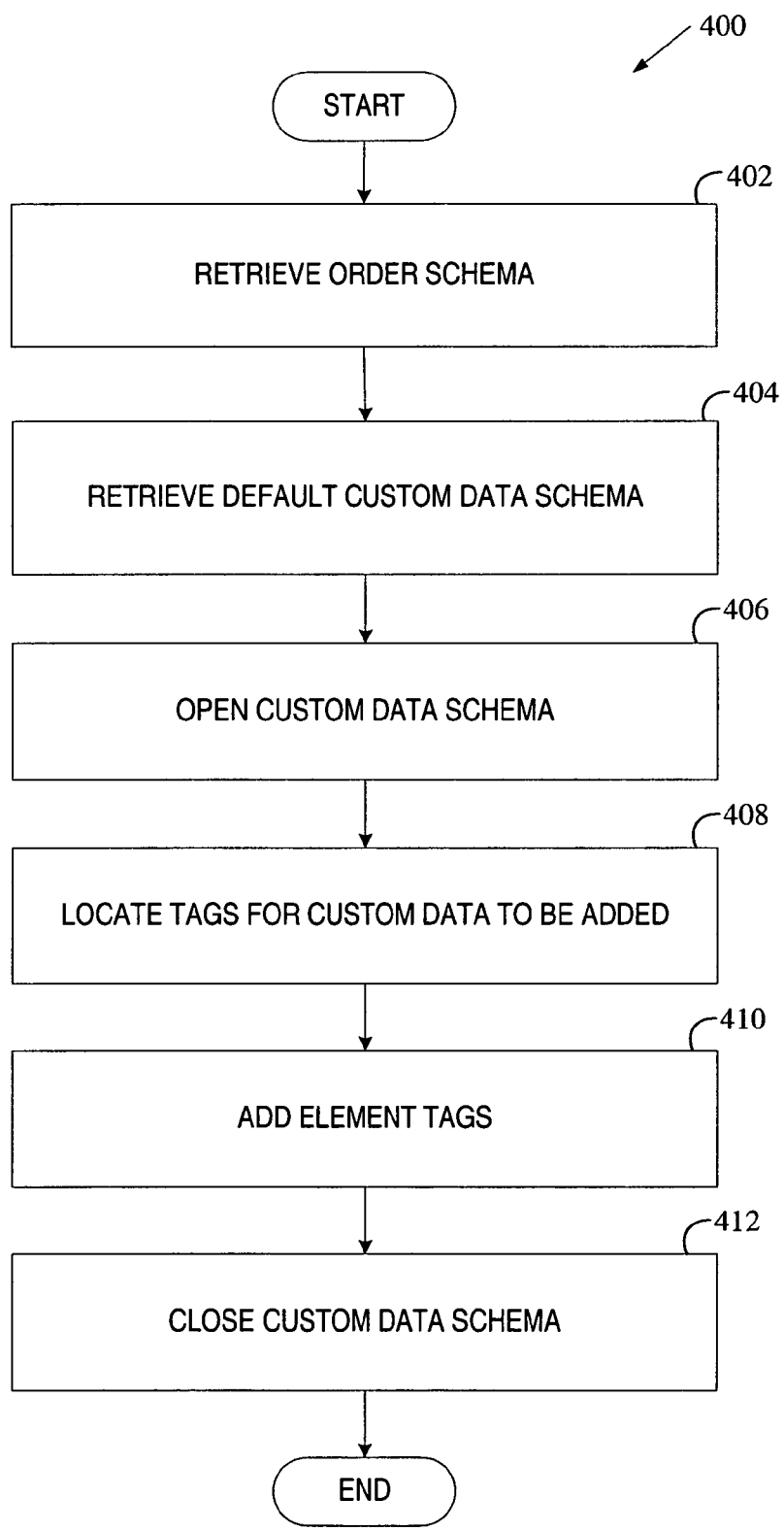
FIG. 4 is a flow diagram of one embodiment of a process for adding custom data to an order class.

FIG. 4 is a flow diagram of one embodiment of a process for adding custom data to an order class. The process may be performed by processing logic that may comprise hardware (e.g., circuitry, dedicated logic, etc.), software (such as run on a general purpose computer system or a dedicated machine), or a combination of both. Processing logic may reside on an integration server such as the integration server 200 of FIG. 2.

At processing block 402, processing logic retrieves a data definition schema for the order class. The schema may be an XML schema file that includes a custom data element of a type that is defined in another file.

At processing block 404, processing logic retrieves the custom data schema for the types of custom data. The schema may be stored in an XML schema file that contains the definition for each type of custom data.

Next, processing logic opens the custom data schema (processing block 406) and locates the tags relating to the custom data type of interest (processing block 408).

Further, processing logic adds the custom data elements to the located tags (processing block 410) and closes the custom data schema with the newly defined data elements (processing block 412).

One embodiment of a common data model representing an order will now be described in more detail in conjunction with FIGS. 5-20. One skilled in the art will appreciate that various other common data models representing an order can be used with the present invention without loss of generality. In addition, the names of data elements illustrated in FIGS. 5-20 are descriptive of the information stored in the data elements.

Figure 5:
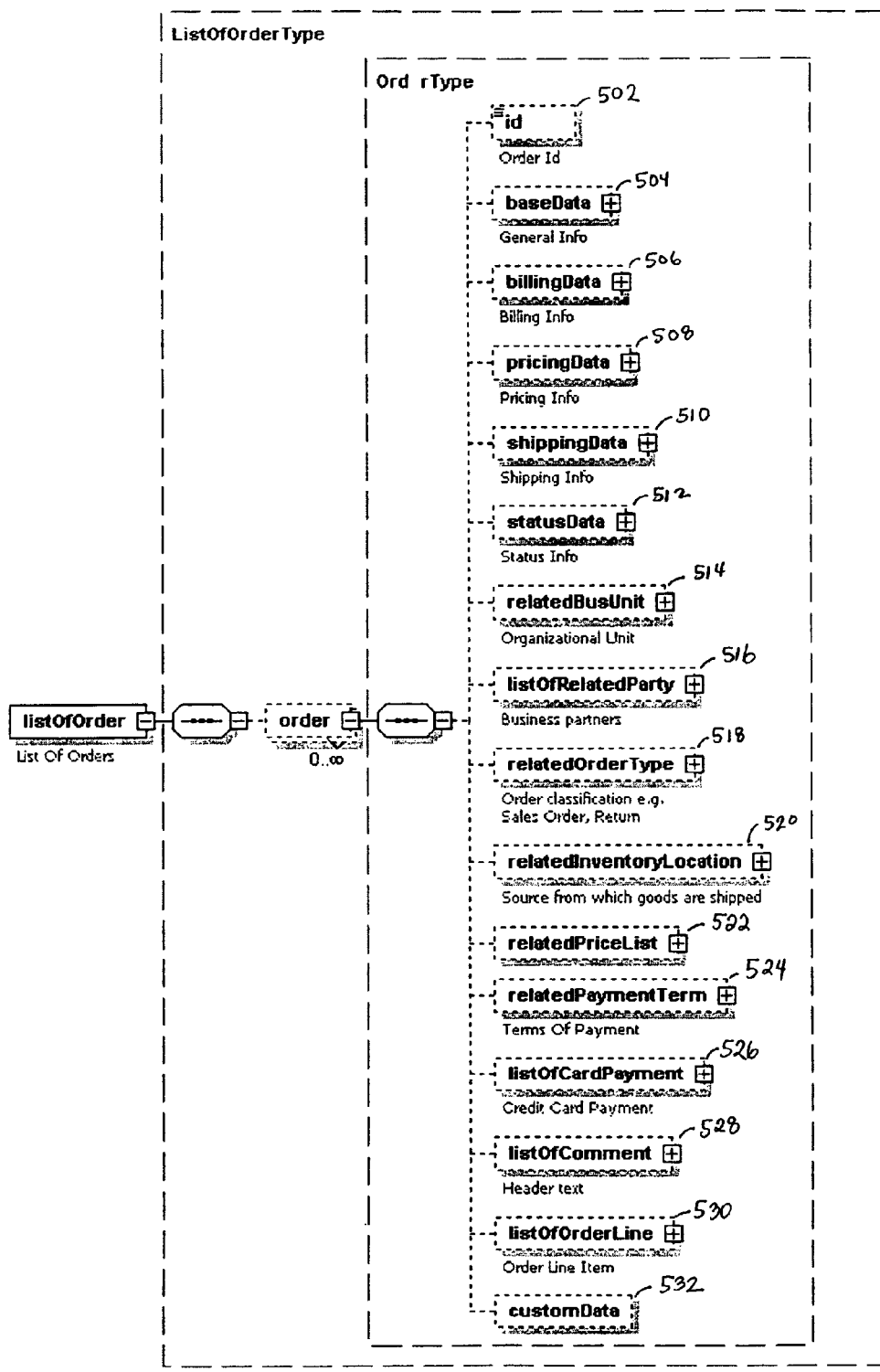
FIGS. 5-20 illustrate one embodiment of a common data model representing an order.

FIG. 5 illustrates the highest level data elements of the order class in one embodiment. The highest level data elements include id 502, baseData 504, billingData 506, pricingData 508, shippingData 510, statusData 512 relatedBusUnit 514, listOfRelatedParty 516, relatedOrderType 518, relatedInventoryLocation 520, relatedPriceList 522, relatedPaymentTerm 524, listOfCardPayment 526, listOfComment 528, listOfOrderLine 530 and customData 532.

The id data element 502 may be a unique identifier of an order. The baseData data element 504 contains general information on the order as will be discussed in greater detail below in conjunction with FIG. 6.

The billingData data element 506 contains information identifying billing terms used for the order as will be discussed in greater detail below in conjunction with FIG. 7.

The pricingData data element 508 contains information on the price of the order as will be discussed in greater detail below in conjunction with FIG. 8.

The shippingData data element 510 contains shipping information as will be discussed in greater detail below in conjunction with FIG. 9.

The statusData data element 512 contains information on the status of the order as will be discussed in greater detail below in conjunction with FIG. 10.

The relatedBusUnit data element 514 identifies a business unit within the company that is responsible for handling data.

The listOfRelatedParty data element 516 identifies parties that are involved in handling the order as will be discussed in greater detail below in conjunction with FIG. 11.

The relatedOrderType data element 518 identifies the type of the order (e.g., a sales order, an order return, an order credit memo, an order debit memo, an order cancellation, a quote order, and an order contract).

The relatedInventoryLocation data element 520 identifies the location from which the goods are shipped. The relatedPriceList data element 522 includes information identifying the basis for pricing the order (e.g., a specific mechanism used for pricing the order). The relatedPaymentTerm data element 524 includes information identifying the payment terms for the order (e.g., an upfront payment, monthly installments, etc.). The listOfCardPayment data element 526 contains information related to a credit card payment as will be discussed in greater detail below in conjunction with FIG. 12.

The listOfComment data element 528 includes comments associated with the order as will be discussed in greater detail below in conjunction with FIG. 13.

The listOfOrderLine data element 530 contains a list of order lines within the order as will be discussed in greater detail below in conjunction with FIG. 14.

The customData data element 532 initially contains no data elements, but custom data elements may be added by defining data elements in the OrderCustomDataType.

Figure 6:
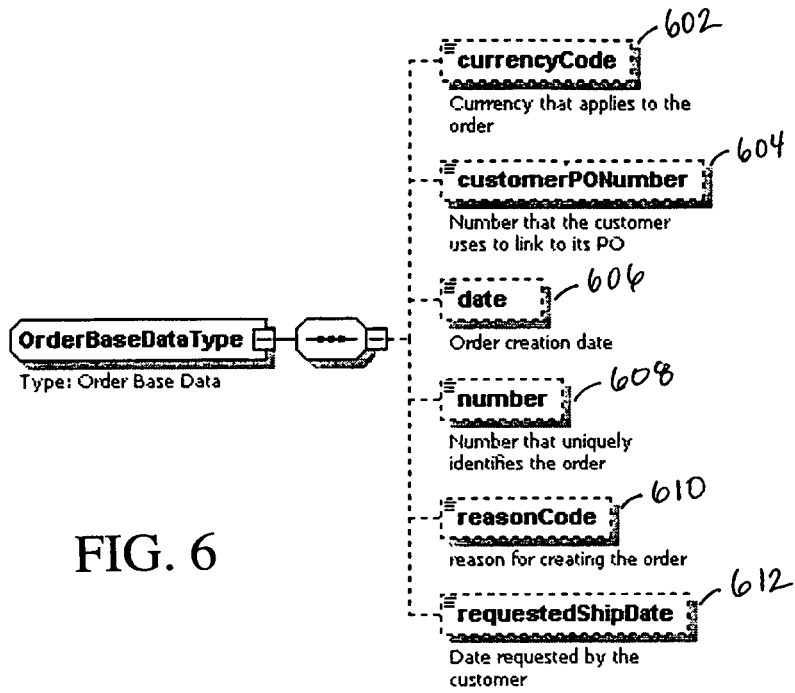

FIG. 6 illustrates the data elements of the baseData class in one embodiment. The data elements of the baseData class include currencyCode 602, customerPONumber 604, date 606, number 608, reasonCode 610, and requestShipDate 612.

The currencyCode data element 602 contains currency information that applies to the order. The customerPONumber data element 604 is the number that the customer uses to link to the Purchase Order. The date data element 606 is the date when the order was created. The number data element 608 is the number that uniquely identified the order. The reasonCode data element 610 identifies the reason for creating the order. The requestShipDate data element 612 is the date for shipping the product as requested by the customer.

Figure 7:
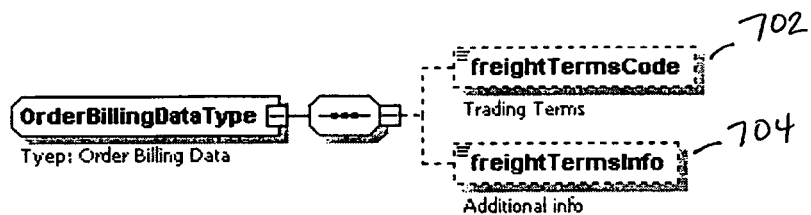

FIG. 7 illustrates the data elements of the BillingData class in one embodiment. These data elements include the freightTermsCode 702 and freightTermsInfo 704.

The frieghtTermsCodeData data element 702 identifies the trading terms (e.g., a free-on-board (FOB) shipment). The freightTermsInfo data element 704 may contain additional information pertaining to the trading terms (e.g., an airport to which the goods are to sent FOB).

Figure 8:
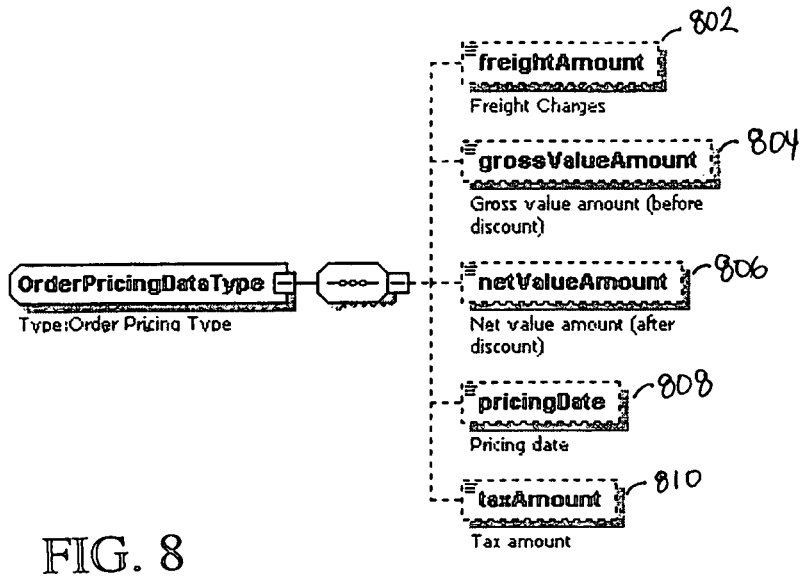

FIG. 8 illustrates the data elements of the pricingData class in one embodiment. The data elements of the pricingData class include freightAmount 802, grossValueAmount 804, netValueAmount 806, pricingDate 808, and taxAmount 810.

The freightAmount data element 802 contains information on charges for the product transportation. The grossValueAmount data element 804 is the gross price amount for the order before the discount. The netValueAmount data element 806 is the net price amount for the order after the discount. The pricingDate data element 808 identifies the date of order pricing. The taxAmount data element 801 contains the tax amount for the order.

Figure 9:
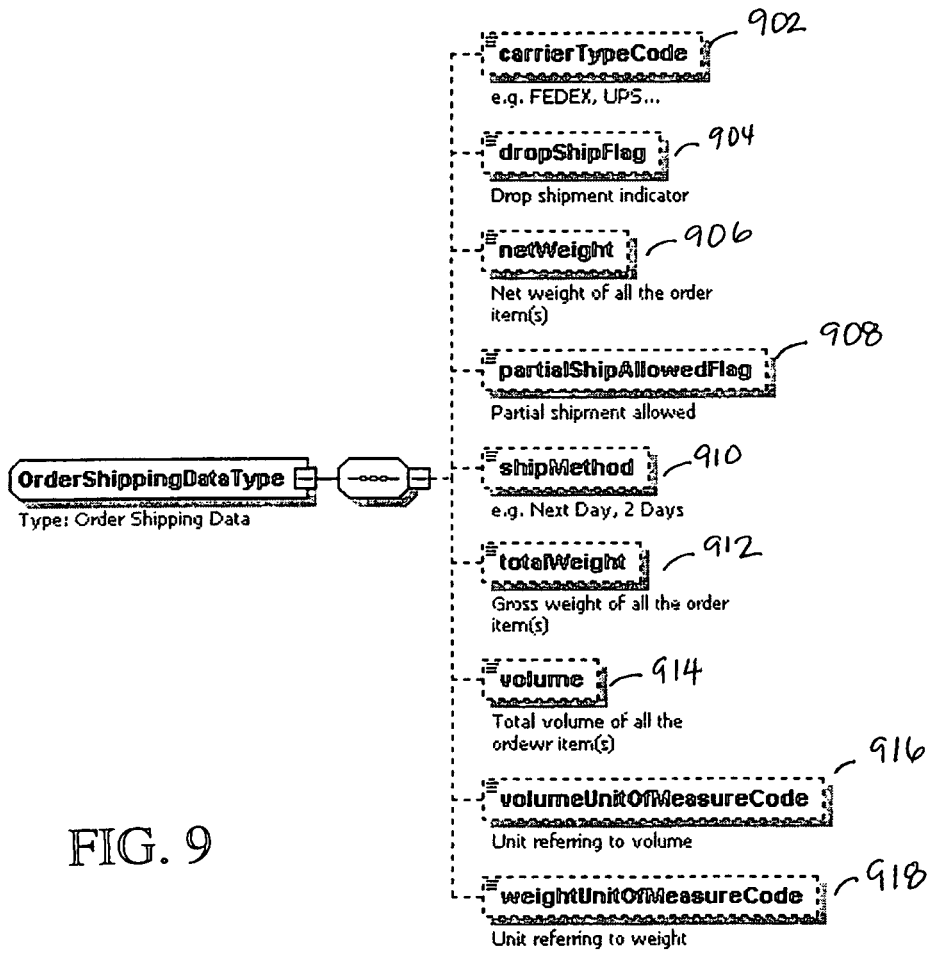

FIG. 9 illustrates the data elements of the shippingData class in one embodiment. These data elements include the carrierTypeCode 902, dropShipFlag 904, netWeight 906, partialShipAllowedFlag 908, shipMethod 910, totalWeight 912, volume 914, volumeUnitOfMeasureCode 916, and weightUnitOfMeasureCode 918.

The carrierTypeCode data element 902 identifies a transportation carrier (e.g., Federal Express, United Postal Service, etc.). The dropShipFlag data element 904 specifies whether the recipient of the order differs from the customer requesting the order. The netWeight data element 906 contains information on the net weight of the entire order. The partialShipAllowedFlag data element 908 specifies whether partial shipment of the order is allowed. The shipMethod data element 910 identifies the shipment method (e.g., Next Day delivery, 2 Days delivery, etc.). The totalWeight data element 912 identifies the gross weight of the entire order. The volume data element 914 identifies the total volume of the order items. The volumeUnitOfMeasureCode data element 916 contains information identifying a unit used for measuring the volume of the order. The weightUnitOfMeasureCode data element 918 contains information identifying a unit used for measuring the weight of the order.

Figure 10:
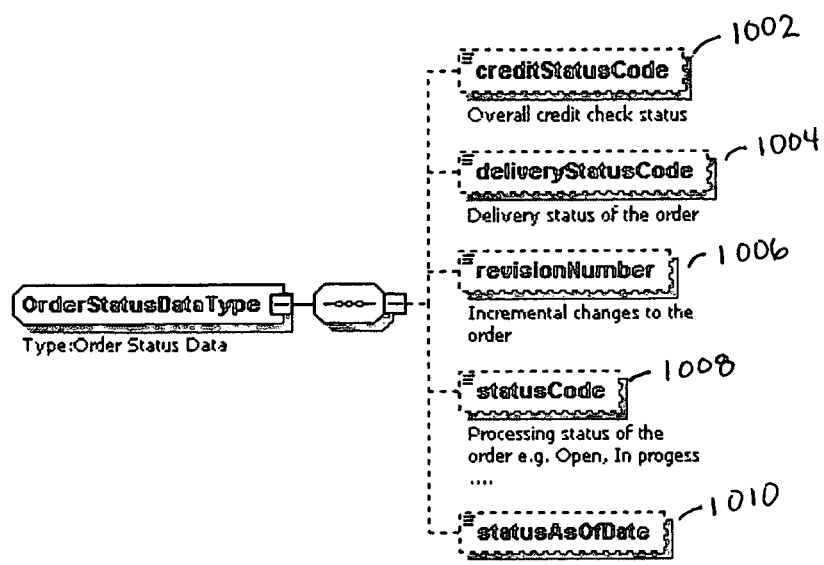

FIG. 10 illustrates the data elements of the statusData class in one embodiment. These data elements include the creditStatusCode 1002, deliveryStatusCode 1004, revisionNumber 1006, statusCode 1008 and statusAsOfDate 1010.

The creditStatusCode data element 1002 contains information on an overall credit check status. The deliveryStatusCode data element 1004 contains information on the delivery status of the order. The revisionNumber data element 1006 identifies incremental changes to the order. The statusCode data element 1008 contains information identifying the processing status of the order (e.g., open, in progress, etc.).

Figure 11:
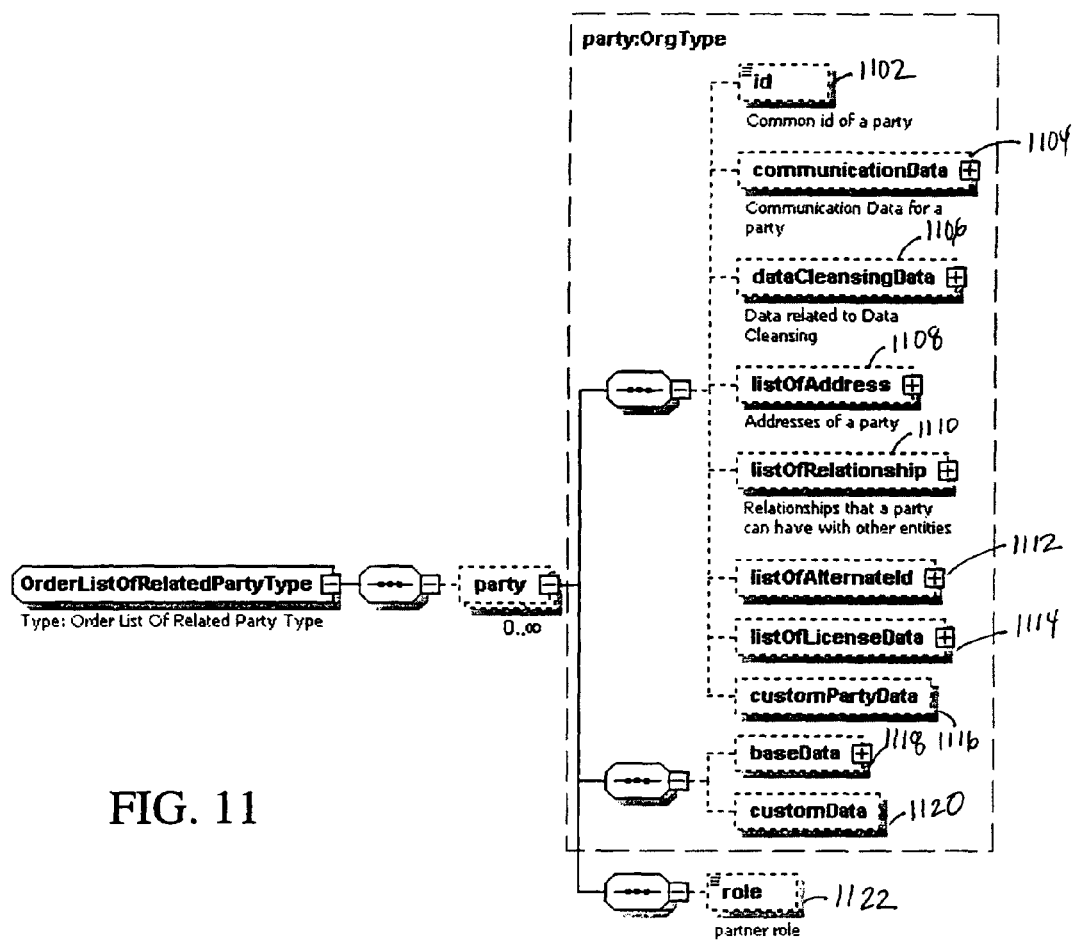

FIG. 11 illustrates the data elements of the listOfRelatedParty class, according to one embodiment. These data elements include data elements of the party class of the organization type and a role data element 1122 that specifies the role of this party with respect to the order. The data elements of the party class include id 1102, communicationData 1104, dataCleasingData 1106, listOfAddress 1108, listOfRealtionship 1110, listOfAlternateId 1112, listOfLicenseData 1114, customPartyData 1116, baseData 1118, and customData 1120.

The id data element 1102 includes the identifier of the party. The communicationData data element 1104 contains general communication data for the party. The dataCleasingData data element 1106 contains information related to data cleansing. The listOfAddress data element 1108 contains information on the addresses of the party. The listOfRealtionship data element 1110 contains information on the relationships that the party may have with other entities. The customData data element 1120 initially contains no data elements, but custom data elements may be added by defining data elements in the PartyCustomDataType.

Figure 12:
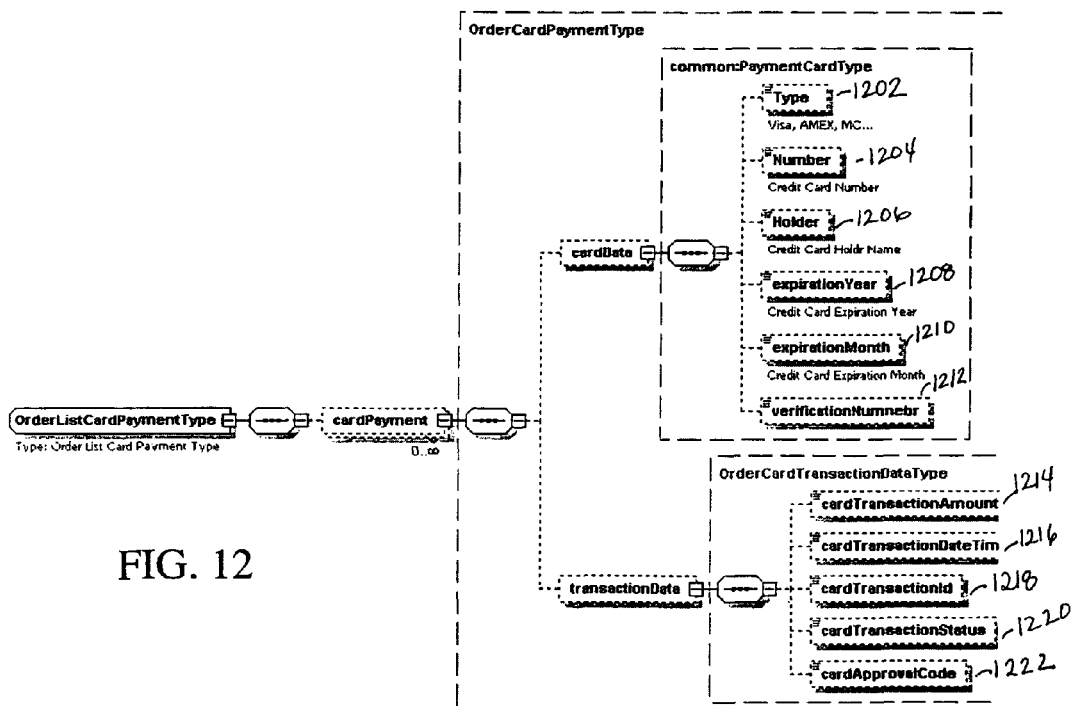

FIG. 12 illustrates the data elements of the listOfCardPayment class in one embodiment. These data elements include credit card data elements associated with general credit card information and transaction data elements associated with transaction information. The credit card data elements include Type 1202, Number 1204, Holder 1206, expirationYear 1208, expirationMonth 1210 and verificationNumber 1212. The transaction data elements include cardTransactionAmount 1214, cardTransactionDateTime 1216, cardTransactionId 1218, cardTransactionStatus 1220 and cardApprovalCode 1222.

Figure 13:
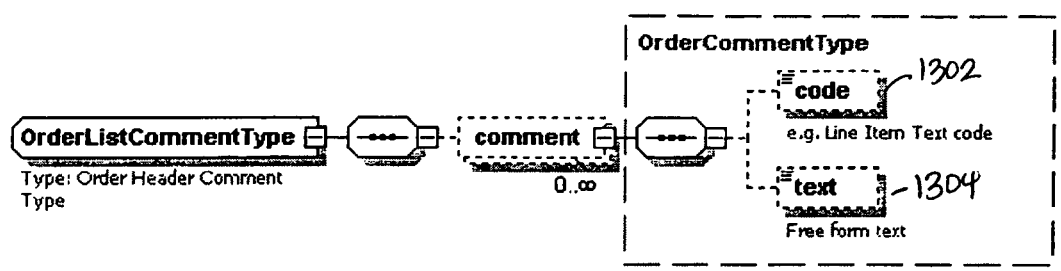

FIG. 13 illustrates the data elements of the listOfComment class in one embodiment. The elements include code 1302 and text 1304. The code data element 1302 identifies the line item for which the comment is provided. The text data element 1304 contains a free form text comment.

Figure 14:
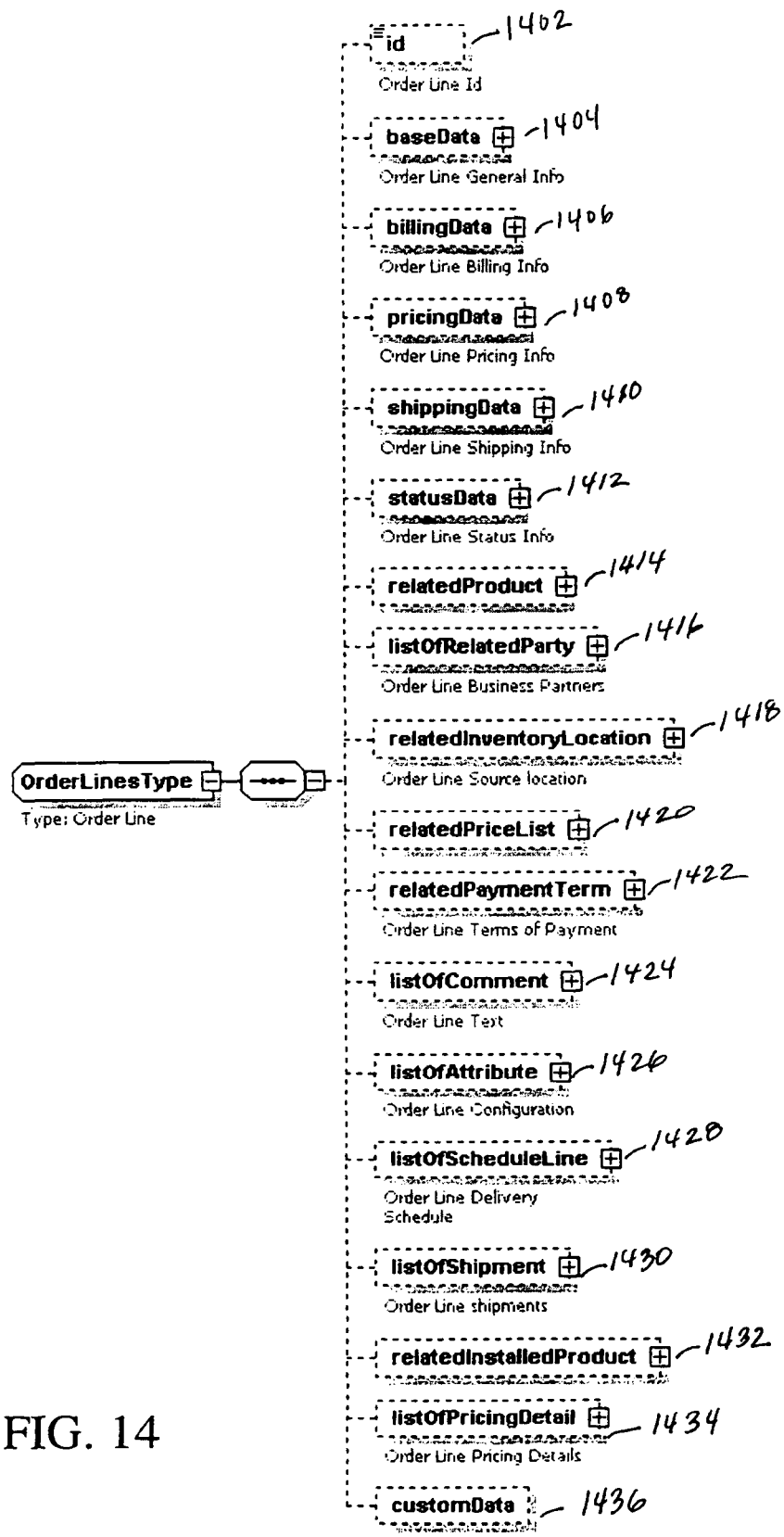

FIG. 14 illustrates the data elements of the listOfOrderLine class in one embodiment. The elements include id 1402, baseData 1404, billingData 1406, pricingData 1408, shippingData 1410, statusData 1412, relatedProduct 1414, listOfRelatedParty 1416, relatedInventoryLocation 1418, relatedPriceList 1420, relatedPaymentTerm 1422, listOfComment 1424, listOfAttribute 1426, listofScheduleLine 1428, listOfShipment 1430, relatedInstalledProduct 1432, listOfPricingDetail 1434, and customData 1436.

The id data element 1402 contains the identifier of an order line. The baseData data element 1404 contains general information on the order line as will be discussed in more detail below in conjunction with FIG. 15.

The billingData data element 1406 contains order line billing information. The pricingData data element 1408 contains pricing information on the order line. The shippingData data element 1410 contains shipping information on the order line. The statusData data element 1412 contains status information on the order line. The relatedProduct data element 1414 contains information on the product of the order line as will be discussed in more detail below in conjunction with FIG. 16.

The listOfRelatedParty data element 1416 contains information on parties associated with the order line. The relatedInventoryLocation data element 1418 contains information on the source of the order line. The relatedPaymentTerm data element 1422 contains information on the terms of payments for the order line. The listOfComment data element 1424 contains information on comments for the order line. The listOfAttribute data element 1426 contains information on product attributes for the order line as will be discussed in more detail below in conjunction with FIG. 17.

The listofScheduleLine data element 1428 contains information on delivery schedule for the order line as will be discussed in more detail below in conjunction with FIG. 18.

The listOfShipment data element 1430 contains information on shipments for the order line as will be discussed in more detail below in conjunction with FIG. 19.

The listOfPricingDetail data element 1434 contains information on pricing details for the order line as will be discussed in more detail below in conjunction with FIG. 20.

The customData data element 1436 initially contains no data elements, but custom data elements may be added by defining data elements in the ProductLineCustomDataType.

Figure 15:
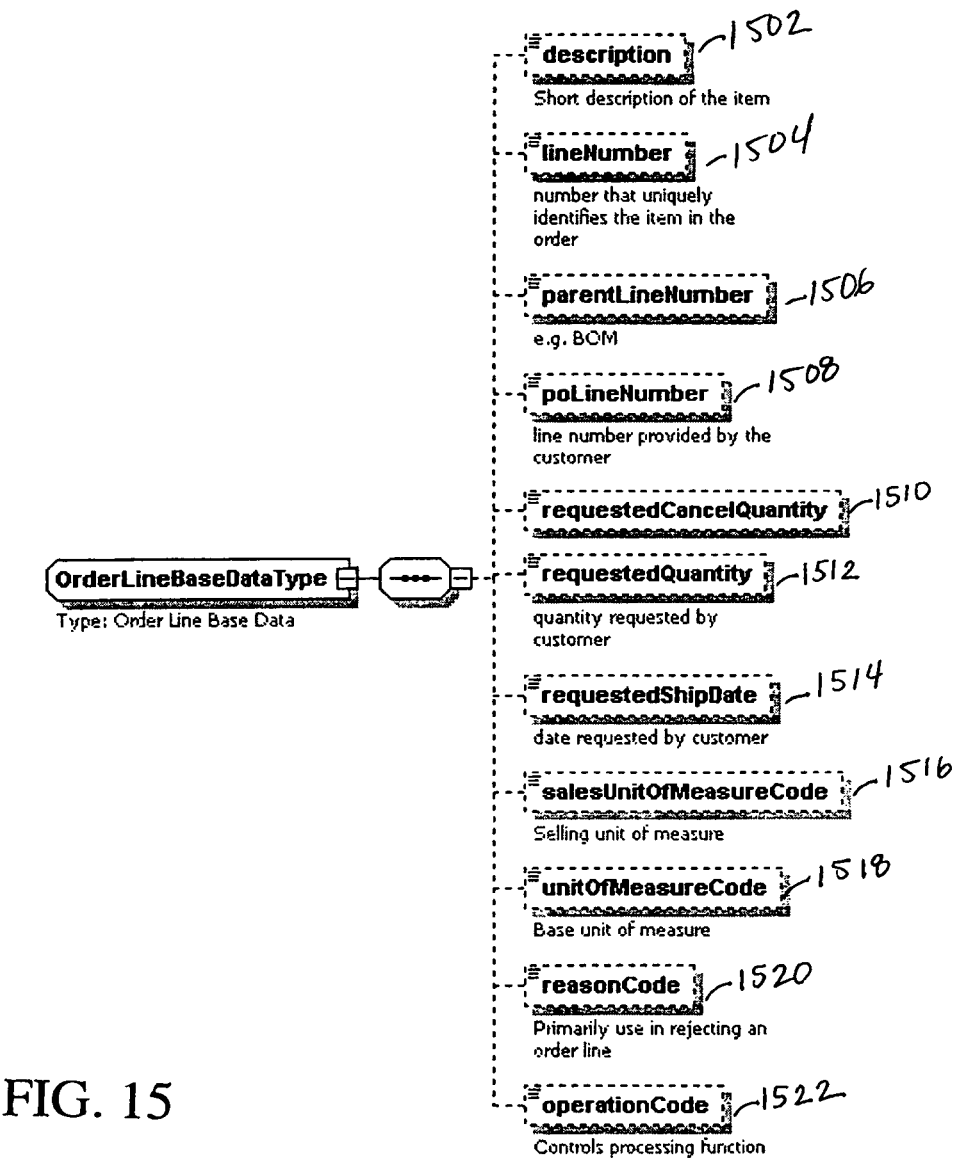

FIG. 15 illustrates the data elements of the lineBaseData class in one embodiment. The elements consist of description 1502, lineNumber 1504, parentLineNumber 1506, poLineNumber 1508, requestedCancelQuantity 1510, requestedQuantity 1512, requestedShipDate 1514, salesUnitOfMeasureCode 1516, unitOfMeasureCode 1518, reasonCode 1520, and operationCode 1522.

The description data element 1502 contains short description of the order line. The lineNumber data element 1504 contains the number that uniquely identifies the order line. The parentLineNumber data element 1506 identifies the order to which the order line belongs. The poLineNumber data element 1508 contains order line number provided by the customer. The requestedQuantity data element 1512 is the quantity requested by the customer. The requestedShipDate data element 1514 is the shipment date requested by the customer. The salesUnitOfMeasureCode data element 1516 identifies the selling unit of measure. The unitOfMeasureCode data element 1518 identifies the base unit of measure. The reasonCode data element 1520 contains information identifying the reason for rejection when the order line is rejected. The operationCode data element 1522 contains information that controls the processing function.

Figure 16:
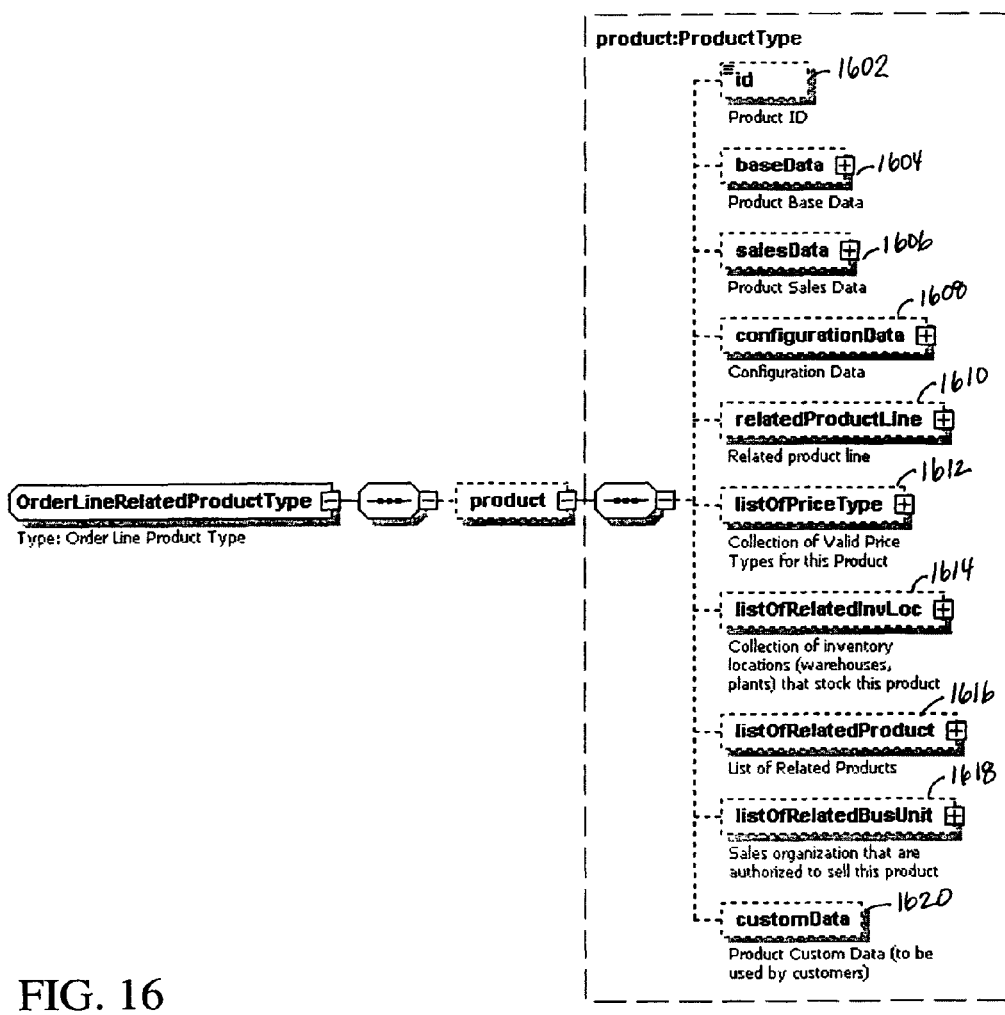

FIG. 16 illustrates the data elements of the relatedProduct class in one embodiment. The data elements are id 1602, baseData 1604, salesData 1606, configurationData 1608, relatedProductLine 1610, listOfProceType 1612, listOfRelatedInvLoc 1614, listOfRealtedProduct 1616, listOfBusUnit 1618, and customData 1620.

The id data element 1602 identifies the product of the order line. The baseData data element 1604 contains general information about the product. The salesData data element 1606 contains information on the product sales. The configurationData data element 1608 contains configuration data. The relatedProductLine data element 1610 identifies the related product line. The listOfPriceType data element 1612 contains information on valid price types of this product. The listOfRelatedInvLoc data element 1614 contains a collection of inventory locations that stock the product, such as warehouses and plants. The listOfRelatedProduct data element 1616 contains information about related products. The listOfBusUnit data element 1618 identifies the business unit that is authorized to sell this product. The customData data element 1620 initially contains no data elements but custom data elements may be added by defining data elements in the ProductCustomDataType.

Figure 17:
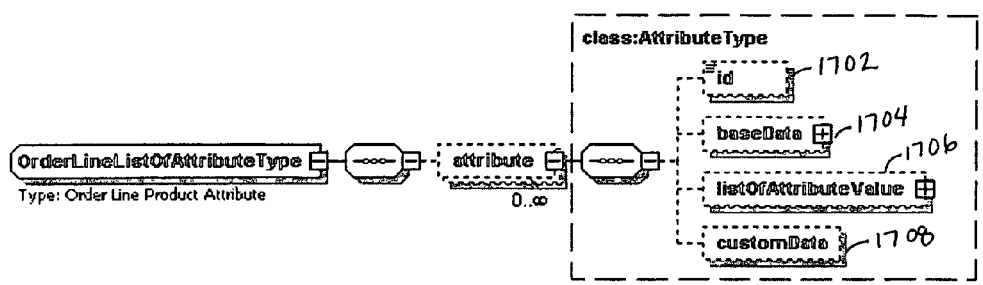

FIG. 17 illustrates the data elements of the listOfAttribute class in one embodiment. The data elements are id 1702, baseData 1704, listOfAttributeValue 1706, and customData 1708.

The id data element 1702 provides the identifier of a product attribute (e.g., size color, volume, etc.). The baseData data element 1704 contains general information about the product attribute. The listOfAttributeValue data elements 1706 contains attribute values. The customData data element 1708 initially contains no data elements, but custom data elements may be added by defining data elements in the ProductAttributeCustomDataType.

Figure 18:
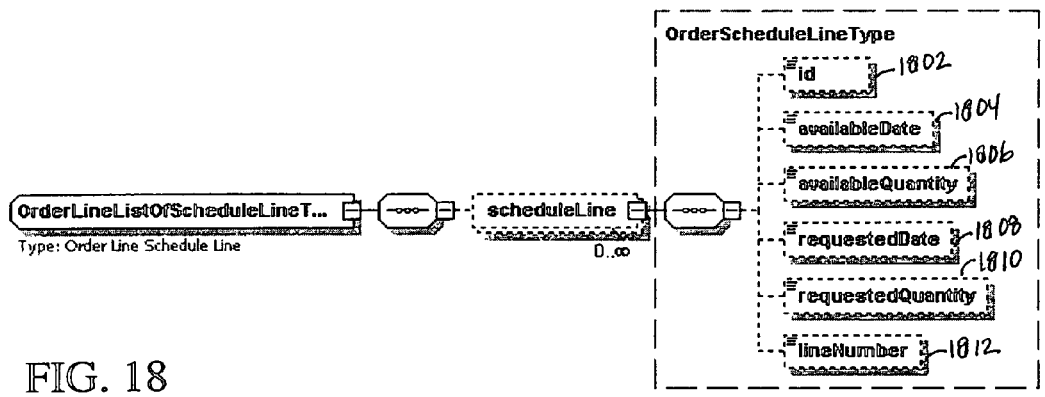

FIG. 18 illustrates the data elements of the listOfScheduleLine class in one embodiment. The data elements are id 1802, availableDate 1804, availableQuantity 1806, requestedDate 1808, requestedQuantity 1810, and lineNumber 1812.

The id data element 1802 identifies a delivery schedule for the order line. The availableDate data element 1804 specifies when the order line is available for delivery. The availableQuantity data element 1806 identifies the quantity of the product that is available for delivery. The requestedDate data element 1808 specifies the delivery date as requested by the customer. The requestedQuantity data element 1810 specifies the quantity requested by the customer. The lineNumber data element 1812 identifies the line order.

Figure 19:
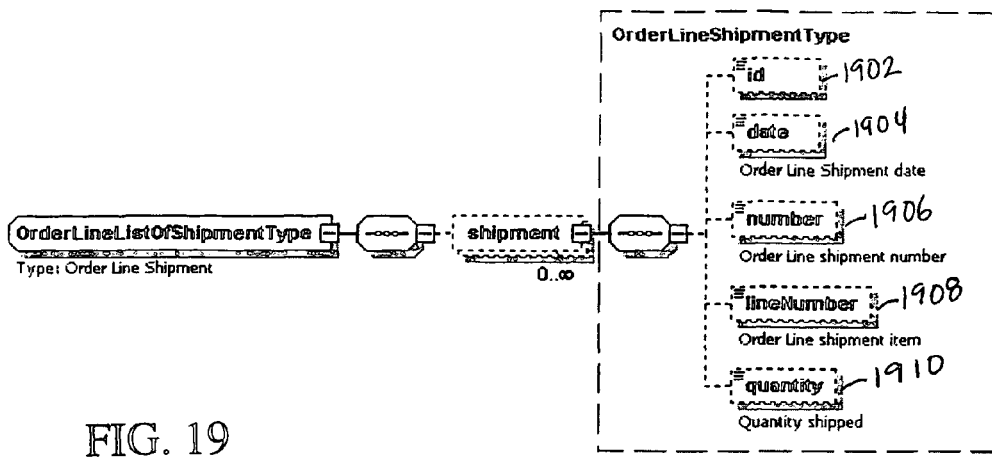

FIG. 19 illustrates the data elements of the listOfShipment class in one embodiment. The data elements are id 1902, date 1904, number 1906, lineNumber 1908, and quantity 1910.

The id data element 1902 identifies the shipment of the order line. The date data element 1904 specifies the date of the order line shipment date. The number data element 1906 contains information on the order line shipment number. The lineNumber data element 1908 contains information on the order line shipment item. The quantity data element 1910 contains information on the quantity shipped.

Figure 20:
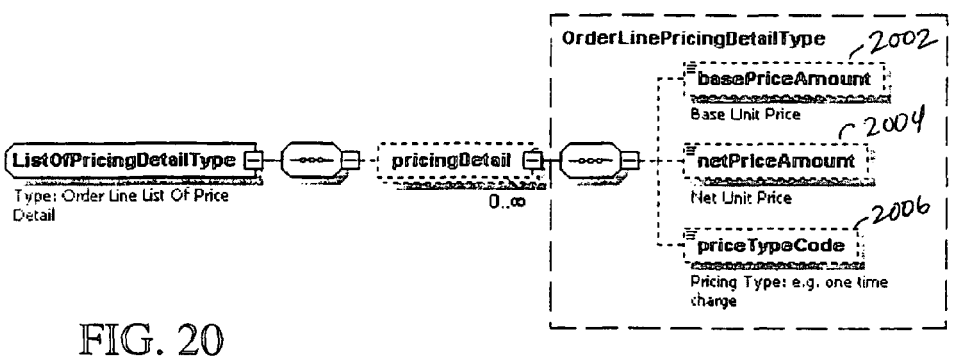

FIG. 20 illustrates the data elements of the pricingDetail class in one embodiment. The data elements are basePriceAmount 2002, netPriceAmount 2004, and the priceTypeCode 2006.

The basePriceAmount data element 2002 contains information on the base unit price. The netPriceAmount data element 2004 contains information on the net unit price. The priceTypeCode data element 2006 contains information on the pricing type (e.g., one time charge).

Figure 21:
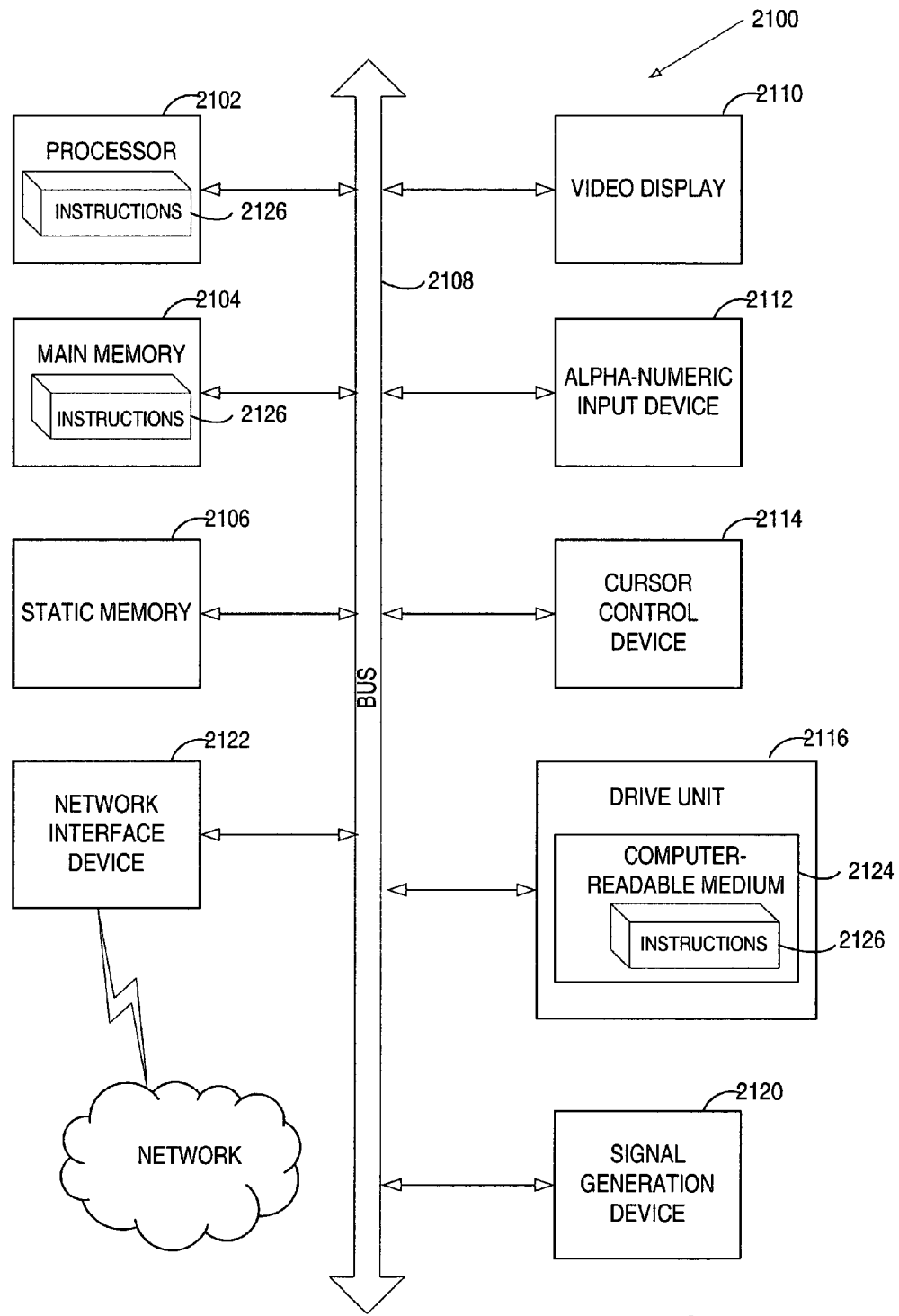
FIG. 21 is a block diagram of an exemplary computer system that may be used to perform one or more of the operations described herein.

FIG. 21 is a block diagram of an exemplary computer system 2100 (e.g., of the integration server 200 of FIG. 2) that may be used to perform one or more of the operations described herein. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 2100 includes a processor 2102, a main memory 2104 and a static memory 2106, which communicate with each other via a bus 2108. The computer system 2100 may further include a video display unit 2110 (e.g., a liquid crystal display (LCD) or a cathode ray tube (CRT)). The computer system 2100 also includes an alpha-numeric input device 2112 (e.g., a keyboard), a cursor control device 2114 (e.g., a mouse), a disk drive unit 2116, a signal generation device 2120 (e.g., a speaker) and a network interface device 2122.

The disk drive unit 2116 includes a computer-readable medium 2124 on which is stored a set of instructions (i.e., software) 2126 embodying any one, or all, of the methodologies described above. The software 2126 is also shown to reside, completely or at least partially, within the main memory 2104 and/or within the processor 2102. The software 2126 may further be transmitted or received via the network interface device 2122. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to included, but not be limited to, solid-state memories, optical and magnetic disks, and carrier wave signals.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A method in a computer system, the method comprising:
defining, using a processor of the computer system, a common data model, wherein
the common data model comprises a hierarchical data structure,
the hierarchical data structure is configured to represent an order class,
the hierarchical data structure comprises
a plurality of common data elements, and
a plurality of custom data elements,
the common data elements are common to a plurality of order types utilized by a plurality of applications,
each of the custom data elements is configured to define application-specific data fields for at least one application of the applications,
the order class is configured to identify a plurality of relationships of an order with a plurality of entities related to the order,
a definition of the order class is represented as an XML schema, and
the defining comprises, for each custom data element of the custom data elements,
retrieving a data definition schema for the order class, wherein
the data definition schema comprises the each custom data element, and
the each custom data element is of a custom data type,
adding the each custom data element to the order class by
retrieving a custom data schema for the custom data type,
locating a tag in the custom data schema relating to the custom data type, and
adding the custom data element to the tag;
defining an order line sub-class using the processor, wherein
the order line sub-class is derived from the order class,
the order line sub-class represents an order line within the order,
the order line sub-class comprises
a set of data elements from the order class, and
a set of additional data elements, and
receiving, at the computer system, a collection of order data from a source application, wherein
the collection of order data is organized in a source data format of the source application, and
the collection of order data represents the order;
performing a first transformation operation on the collection of order data using the common data model, wherein
the first transformation operation is performed by the processor,
the first data transformation operation comprises
transforming the collection of order data from a source data format of the source application into a common data format,
the transforming the collection of order data comprises transforming all data elements in the order line sub-class of the order into the common data format,
the common data format is defined based on the order class, and
the common data format comprises the plurality of common data elements;
performing a second transformation operation on the collection of order data, wherein
the second transformation operation is performed by the processor, and
the second transformation operation transforms the collection of order data from the common data format to a destination data format of a destination application; and
sending the collection of order data in the destination data format to the destination application.

2. The method of claim 1 wherein the plurality of order types comprises two or more order types selected from the group consisting of a sales order, an order return, an order credit memo, an order debit memo, an order cancellation, a quote order, and an order contract.

3. The method of claim 1 wherein the plurality of relationships of the order is selected from the group consisting of relationships with billing terms, relationships with shipping terms, relationships with pricing terms, relationships with payment terms, relationships with parties responsible for the order, relationships with parties participating in the order, and relationships with inventory locations.

4. The method of claim 1 wherein the custom data elements define data fields that are specific to each of a plurality of business systems.

5. The method of claim 1, wherein a transformation order map defines data mappings of the collection of order data from the source data format into the common data format.

6. The method of claim 1 wherein performing a first transformation operation further comprises:
instantiating the order class;
initializing data elements of the instantiated order class;
mapping the received data to the data elements of the instantiated order class;
determining that the received data includes information pertaining to one or more order lines within the order;
instantiating an order line sub-class for each of the one or more order lines;
initializing data elements of each instantiated order line sub-class;
copying data from the data elements of the instantiated order class to corresponding data elements of each instantiated order line sub-class; and
overwriting the copied data with the information pertaining to the one or more order lines when the copied data differs from the information pertaining to the one or more order lines.

7. A computer-readable storage medium having executable instructions to cause a computer system to perform a method comprising:
defining a common data model, wherein
the common data model comprises a hierarchical data structure,
the hierarchical data structure is configured to represent an order class,
the hierarchical data structure comprises
a plurality of common data elements, and
a plurality of custom data elements, the plurality of common data elements is common to a plurality of order types utilized by a plurality of applications, each of the custom data elements is configured to define application-specific data fields for at least one application of the applications, the defining comprises, for each custom data element of the custom data elements, retrieving a data definition schema for the order class, wherein the data definition schema comprises the each custom data element, and the each custom data element is of a custom data type, and adding the each custom data element to the order class by retrieving a custom data schema for the custom data type, locating a tag in the custom data schema relating to the custom data type, and adding the custom data element to the tag;

the order class identifying a plurality of relationships of an order with a plurality of entities related to the order, and a definition of the order class is represented as an XML schema;

receiving a collection of order data from a source application, wherein the collection of order data is organized in a source data format of the source application;

performing a first transformation operation on the collection of order data using the common data model, wherein the first data transformation operation transforms the collection of order data from a source data format of the source application into a common data format defined by the order class, and the common data format comprises the plurality of common data elements;

defining an order line sub-class using the processor, wherein the order line sub-class is derived from the order class, the order line sub-class represents an order line within the order, the order line sub-class comprises a set of data elements from the order class, and a set of additional data elements, and the first transformation operation further transforms all data elements in the order line sub-class into the common data format defined by the order class;

performing a second transformation operation on the collection of order data, wherein the second transformation operation transforms the collection of order data from the common data format to a destination data format of a destination application; and sending the collection of order data in the destination data format to the destination application.

8. The computer-readable storage medium of claim 7 wherein the plurality of order types comprises two or more order types selected from the group consisting of a sales order, an order return, an order credit memo, an order debit memo, an order cancellation, a quote order, and an order contract.

9. The computer-readable storage medium of claim 7 wherein the plurality of relationships of the order is selected from the group consisting of relationships with billing terms, relationships with shipping terms, relationships with pricing terms, relationships with payment terms, relationships with parties responsible for the order, relationships with parties participating in the order, and relationships with inventory locations.

10. A computer system comprising:

a memory; and a processor coupled to the memory, the processor executing a set of instructions which cause the processor to define a common data model, wherein the common data model comprises a hierarchical data structure, the hierarchical data structure is configured to represent an order class, the hierarchical data structure comprises a plurality of common data elements, and a plurality of custom data elements, the plurality of common data elements is common to a plurality of order types utilized by a plurality of applications, each of the custom data elements is configured to define application-specific data fields for at least one application of the applications, the defining comprises, for each custom data element of the custom data elements, retrieving a data definition schema for the order class, wherein the data definition schema comprises the each custom data element, and the each custom data element is of a custom data type, and adding the each custom data element to the order class by retrieving a custom data schema for the custom data type, locating a tag in the custom data schema relating to the custom data type, and adding the custom data element to the tag;

the order class identifying a plurality of relationships of an order with a plurality of entities related to the order, and a definition of the order class is represented as an XML schema;

receive a collection of order data from a source application, wherein the collection of order data is organized in a source data format of the source application;

perform a first transformation operation on the collection of order data using the common data model, wherein the first data transformation operation transforms the collection of order data from a source data format of the source application into a common data format defined by the order class, and the common data format comprises the plurality of common data elements;

derive an order line sub-class, wherein the order line sub-class is derived from the order class, the order line sub-class represents an order line within the order, the order line sub-class includes a set of data elements from the order class and a set of additional data elements, and the first transformation operation further transforms all data elements in the order line sub-class into the common data format defined by the order class;

perform a second transformation operation on the collection of order data, wherein
the second transformation operation transforms the collection of order data from the common data format to a destination data format of a destination application; and
send the collection of order data in the destination data format to the destination application.

\* \* \* \* \*

UNITED STATES PATENT AND TRADEMARK OFFICE
CERTIFICATE OF CORRECTION

PATENT NO.         : 8,762,415 B2
APPLICATION NO.    : 10/703053
DATED              : June 24, 2014
INVENTOR(S)        : Catahan, Jr. et al.

It is certified that error appears in the above-identified patent and that said Letters Patent is hereby corrected as shown below:

In the Drawings

On sheet 4 of 18, in figure 3B, under Reference Numeral 370, line 3, delete "LIN" and insert -- LINE --, therefor.

In the Specification

Column 8, line 15, delete "512 related-" and insert -- 512, related- --, therefor.

Column 10, line 3, delete "CleasingData" and insert -- CleansingData --, therefor.

Column 10, lines 8-9, delete "CleasingData" and insert -- CleansingData --, therefor.

Signed and Sealed this
Twenty-fourth Day of February, 2015

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,762,415 B2 | Page 1 of 1 |
| APPLICATION NO. | : 10/703053 | |
| DATED | : June 24, 2014 | |
| INVENTOR(S) | : Catahan, Jr. et al. | |

It is certified that error appears in the above-identified patent and that said Letters Patent is hereby corrected as shown below:

On the title page, in the illustrative figure, under Ref. Numeral 370, line 3, delete "LIN" and insert -- LINE --.

In the Drawings

On sheet 4 of 18, in figure 3B, under Reference Numeral 370, line 3, delete "LIN" and insert -- LINE --, therefor.

In the Specification

Column 8, line 15, delete "512 related-" and insert -- 512, related- --, therefor.

Column 10, line 3, delete "CleasingData" and insert -- CleansingData --, therefor.

Column 10, lines 8-9, delete "CleasingData" and insert -- CleansingData --, therefor.

This certificate supersedes the Certificate of Correction issued February 24, 2015.

Signed and Sealed this
Seventeenth Day of March, 2015

Michelle K. Lee
*Director of the United States Patent and Trademark Office*